United States Patent [19]
Bezos

[11] Patent Number: 5,622,270
[45] Date of Patent: Apr. 22, 1997

[54] COMPACT DISK STORAGE AND DISPLAY SYSTEM

[76] Inventor: Marcelo Bezos, 2899 Collins Ave. #1417, Miami Beach, Fla. 33140-4419

[21] Appl. No.: 317,895

[22] Filed: Oct. 4, 1994

[51] Int. Cl.⁶ ............................................. A47G 29/00
[52] U.S. Cl. ............................. 211/40; 211/89; 211/41
[58] Field of Search ........................... 211/40, 41, 89, 211/94; 248/316.7; 206/309, 387.1, 477, 480

[56] References Cited

U.S. PATENT DOCUMENTS

| | | | |
|---|---|---|---|
| 4,084,700 | 4/1978 | Dunchock | 211/41 |
| 4,447,049 | 5/1984 | Rudy | 269/46 |
| 4,573,589 | 3/1986 | Atkinson | 211/41 |
| 4,867,306 | 9/1989 | Factor | 206/309 |
| 4,919,287 | 4/1990 | Haskett et al. | 211/41 |
| 5,052,564 | 10/1991 | Zuzack | 211/40 |
| 5,105,952 | 4/1992 | Krattiger | 211/41 |
| 5,148,925 | 9/1992 | Althoff et al. | 211/41 |
| 5,269,418 | 12/1993 | Meissner et al. | 211/183 |

*Primary Examiner*—Karen J. Chotkowski
*Assistant Examiner*—Gwendolyn Wrenn
*Attorney, Agent, or Firm*—Eckert Seamans Cherin & Mellott

[57] ABSTRACT

A modular system is capable of storing and displaying up to N compact disk cases or other types of similarly sized, cases having at least one slot on each of two spaced apart, parallel peripheral edges. A modular unit includes a frame supporting N pairs of spaced cantilevers projecting outward from a front side of the frame, N being at least one. Each of the N pairs of cantilevers includes a first cantilever and a second cantilever, each of the first cantilever and second cantilever having a stop surface facing the stop surface of the other and a tab projecting from the stop surface, wherein the first and second cantilever can cooperatively grip one of the cases when the tabs are inserted in the first slot and the second slot.

37 Claims, 5 Drawing Sheets

COMPACT DISK STORAGE AND DISPLAY SYSTEM

BACKGROUND OF THE INVENTION

1. Field of the Invention

The invention relates to storage and display systems for rectangular-shaped containers, and, in particular, to a modular storage and display system for compact disk cases.

2. Description of the Prior Art

Compact laser disks (CD's) provide a popular fixed medium for digital sound recordings, and have largely displaced analog recordings on long playing vinyl disks (LP's) and magnetic tape cartridges in the popular music marketplace. The digitally reproduced sound from a CD is generally of a superior quality than that found in analog recordings, and CD's are not as subject to damage in normal use as are LP's and tape cartridges. As their name describes, CD's are also conveniently small sized, and therefore a library of recordings does not require a large storage space.

CD's are typically packaged in a clear, rigid plastic container, or CD case, having exterior dimensions about 5.6 inches wide, about 5.0 inches high and about 0.7 inches deep. The front and back faces typically display printed material often including graphic designs and information describing the recording. The title and artist is typically shown on one or more of the peripheral edges. A piece of paper containing the printed material is held in place by a pair of inwardly extending tabs on each of the top and bottom edges of the CD case. A slot is located adjacent each tab in both the top and bottom edges. In some cases, there are three slots and three tabs on each of the top and bottom edge. A hinged door at one face can be opened to access the CD contained within the case.

Retail outlets for CD's typically stock the CD's in bins where only a peripheral edge is visible. Consumers typically store their CD collections in box-like containers or in CD "towers" that only display the edge of each CD case. It would be aesthetically pleasing to have a CD storage system that also displays the graphic designs of the faces of several CD cases, rather than obscuring them from view. The collage formed by a display of numerous different CD cases can be an aid to marketing the displayed CD's in retail stores, and also can provide a changeable art form for each collector in his or her home.

U.S. Pat. No. 4,867,306 discloses a compact disk storage rack providing a display for a plurality of CD cases. A planar panel has a plurality of parallel spaced, rigid edges each having an upwardly extending lip. The ledges are spaced apart a distance less than the dimension of the CD case so that a case resting on a first ledge is stored at an angle to the panel and frictionally gripped by an outer corner of an adjacent second ledge, located above the first ledge, and the inner edge of the lip of the first ledge. The system does not provide a planar display, and a bottom part of each CD case is obscured by the lip of the ledge it rests upon and the top of an adjacent CD disk on the ledge below, thereby disturbing the aesthetic quality of the display. This system also suffers disadvantages in that a CD case can easily be dislodged from the panel by a bump, and the ledges must be about horizontal to prevent the CD cases from sliding out of position under the influence of gravity.

U.S. Pat. No. 5,052,564 describes a CD display rack having a plurality of horizontal ledges extending from a back wall. The bottom edge of each CD case rests against a notch or a lip spaced from the back wall and defined by an upper surface of one of the ledges, and the top edge rests against the back wall. The CD case is thus disposed at an angle to the vertical. A kick bar is located on the back wall behind the case to enable removal of the CD case by pressing on a periphery of the front face. This system also stores the CD cases at an angle, and must be oriented with the ledges about horizontal. The CD cases are not positively gripped and could fall out if the rack is bumped.

U.S. Pat. No. 5,105,952 discloses a system wherein each CD case rests on an upper surface of a horizontally extending bottom ledge and leans back at an angle against a back wall. The bottom surface of each ledge defines a downward extending lip that extends over the upper part of an second CD case located adjacently below the first to releasably retain the second CD case. Again, this system is subject to disturbance of a display from bumps, obscures a part of the front face of each CD case, must be mounted with the ledges extending about horizontally, and displays the CD cases at an angle.

U.S. Pat. No. 5,148,925 discloses a wall mounted rack having a plurality of spaced apart, horizontally extending rack members. Each rack member includes a wall member and a shelf extending horizontally therefrom. The shelf has an upwardly extending first lip and a downward extending second lip spaced apart from the wall member. CD cases rest upon an upper surface of a lower shelf and are retained by the first lip of the lower shelf and the second lip of an upper shelf located next above the lower shelf. CD cases can slip sideways out of position, and the lips obscure a portion of the face of each CD case.

U.S. Pat. No. 4,084,700 discloses a display rack for mounting a rectangular-shaped object, such as a mirror, having an upright, U-shaped framing member projecting from the face of a body panel. A plurality of support tabs are located along each of the upright legs of the framing member and project inwardly towards the opposing leg. The rectangular-shaped object is inserted in the display by sliding it down between the opening at the top of the U-shaped framing member and behind the tabs. This type of system is impractical for storing more than one CD case, and the tabs obscure part of the face of each case displayed.

There is a need for a system for storing CD cases in a planar display that does not obscure the graphic art on the case from view. There is also a need for a storage and display system for a plurality of CD cases that positively grips each of the CD cases so that they cannot be jarred or tipped out of position by accident. There is also a need for a simple, modular system for storing and displaying a plurality of compact disks.

SUMMARY OF THE INVENTION

These and other needs are met according to the invention for a storage and display system for generally rectangular-shaped, slotted objects, such as CD cases, or cassettes, that include a front face and a rear face spaced apart therefrom, and four peripheral edges extending between the front and rear faces. A first slot is located on a first edge of the slotted object and a second slot is located on a second edge opposite the first edge. CD cases additionally include a hinged door on the rear face that can be opened to access an enclosed CD.

In its simplest sense, the invention includes a basic unit that provides an arrangement for removably inserting first and second tabs into the first and second slots, respectively, such that when the tabs are inserted into the slots, the slotted object is cooperatively gripped by the tabs and stop surfaces adjacent each tab. A support structure maintains each tab in a generally fixed spatial position. The tabs thus cooperatively grip the slotted object when inserted into the slots, such that a face of the slotted object between the first and second edges is displayed and can be viewed in its entirety.

According to one aspect of the invention, the support structure includes a support frame having a front side, and spaced apart first and second cantilevers extending outward from the front side of the support frame supporting the first and second tabs, respectively, wherein at least one or both of the first and second cantilevers can be resiliently movable. The first tab extends in a first direction toward the second cantilever and the second tab extends in a second direction toward the first cantilever. The cantilevers provide the stop surfaces for when the tabs are inserted in the slots.

According to another aspect of the invention, the first cantilever may be angled towards the second cantilever and the second cantilever may also be angled towards the first cantilever. This feature is important when two basic units are adjacently arranged, top to bottom, for storing two slotted objects. The angling of the cantilevers provides sufficient space to insert a finger between the adjacently stored slotted objects for removing one of them, as will be described hereinafter.

According to another aspect of the invention, structure is provided for inhibiting opening of the hinged door of the object during installation into or removal from the storage and display system. A door stop surface can be provided on at least one of the first and second cantilevers, located about between the tab on that cantilever and the frame and spaced apart from each.

According to another aspect of the invention, each cantilever defines an opening adjacent the frame. The size of the opening is selected to obtain a selected resiliency of the cantilever, which can also vary with a choice of material for fabricating the cantilever and the area of contact between the cantilever and the frame.

Another feature of the invention is that the support frame may be modular and rectangular-shaped, wherein the support frame can be positioned adjacent an identical, second support frame for adjacently storing and displaying two rectangular-shaped cases without a significant gap therebetween. This type of arrangement can provide continuity between the graphic design of two adjacently stored and displayed cases, which can provide a visually pleasing effect.

The slotted object, or case, is inserted in a unit by positioning the first edge over the first tab, inserting the first tab into the first slot, deflecting the first tab back and away from the second tab, for example, by pressing the case towards the first tab, then tilting the second edge of the case towards the second tab, inserting the second tab into the second slot, and releasing the pressure on the first tab such that the first and second tabs cooperatively grip the case. A case is removed from a unit by moving the first tab away from the second tab, for example, by again pressing the case against the first tab in that direction, removing the second tab from the second slot, then tilting the second edge of the case away from the second tab, and moving the case away from the first tab to disengage the first slot and free the case.

The system can include a plurality of generally coplanar basic units as described hereinbefore for holding a single case, the coplanar units being arranged adjacent to each other in a unitary module to store and display a plurality of similarly sized cases side by side, about top edge to bottom edge, or both. If the cases each have a graphic design on the displayed side, then a visually pleasing collage can be created by the display of a grouping of cases in a unitary module. According to a preferred embodiment, each unitary module is adapted for placement adjacent another unitary module such that the collage can be extended and enlarged without significantly noticeable discontinuity.

It is an object of the invention to provide a storage and display system for rectangular-shaped, slotted objects.

It is another object of the invention to provide a modular storage and display system for compact disk cases that securely grips each case.

It is another object of the invention to provide an attractive storage and display system for compact disk cases that displays an entire face of each case.

It is another object of the invention to provide a system for storing and displaying a plurality of compact disk cases in a planar array.

It is another object of the invention to provide a system for storing and displaying compact disk cases that is adapted for easy insertion and removal of each compact disk case It is another object of the invention to provide a system for storing and displaying compact disk cases that is durable, lightweight and easy to manufacture and install.

These and other objects of the invention will be more fully understood from the following description of the invention with reference to the illustrations appended hereto.

DETAILED DESCRIPTION OF THE INVENTION

Figure 1:
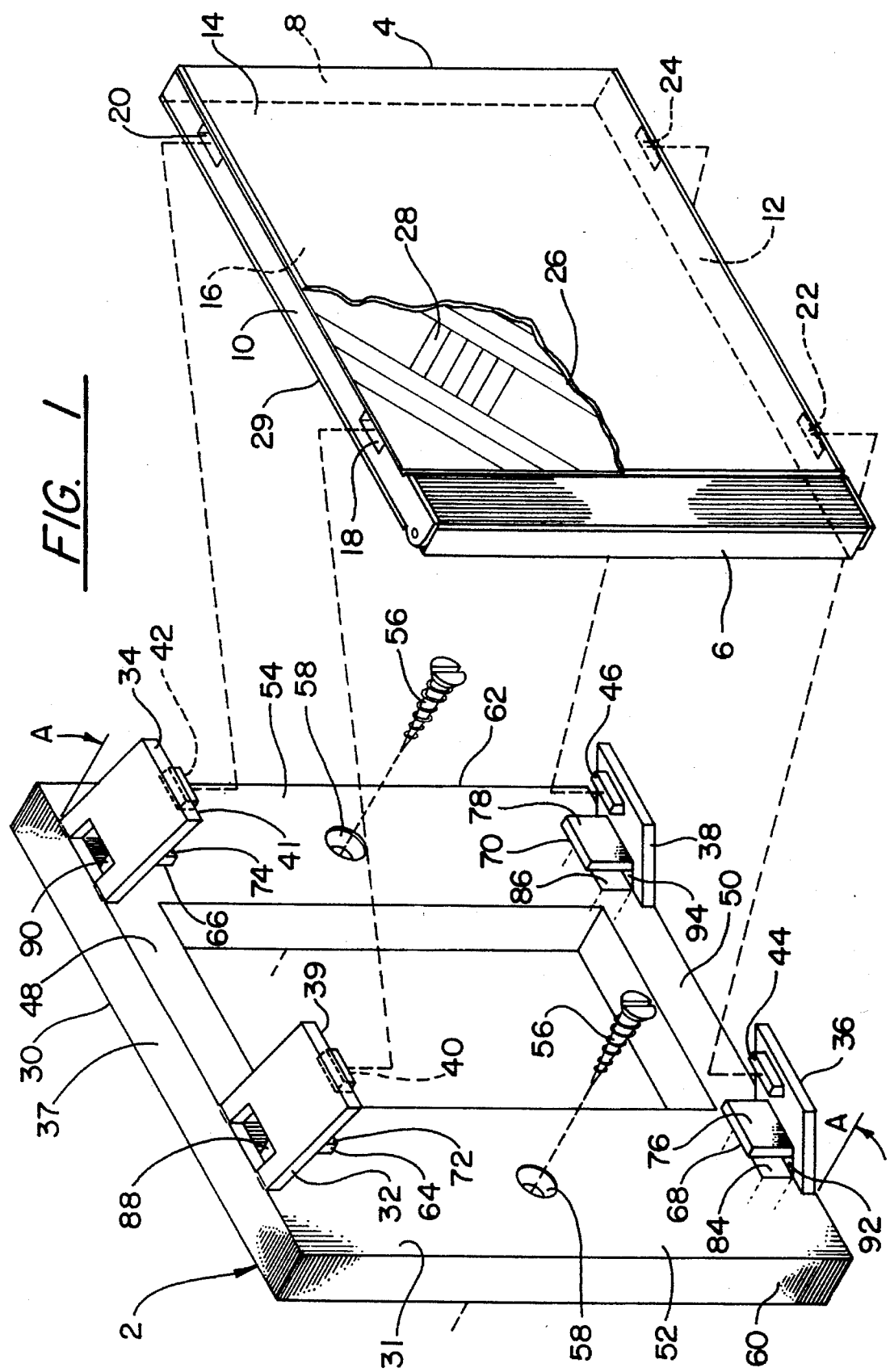
FIG. 1 is an exploded perspective view of one embodiment of a modular unit for storing and displaying a single compact disk case.
Figure 6:
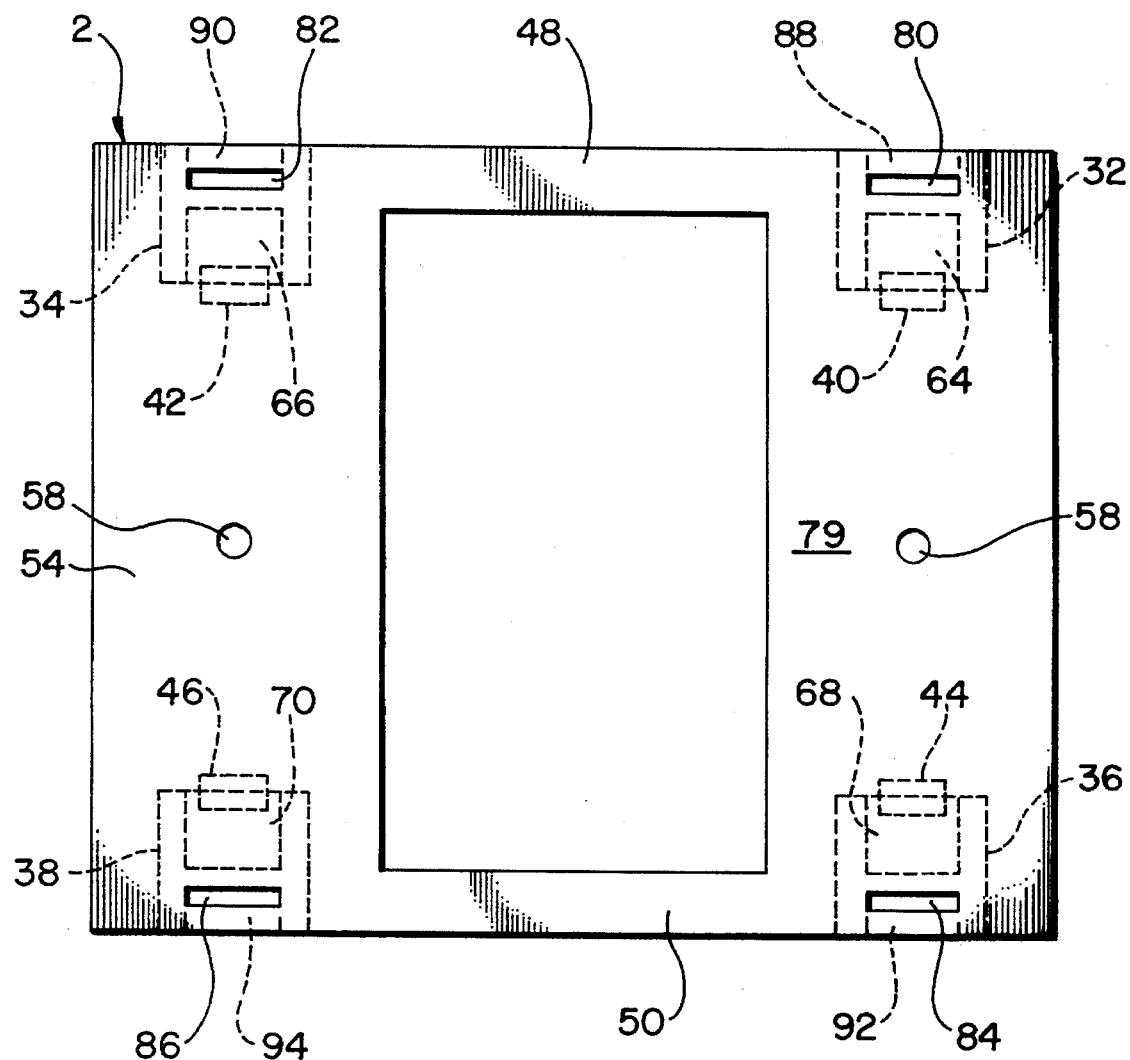
FIG. 6 is a rear elevation view of the modular unit of FIG. 1.

Referring now to the drawings, a preferred embodiment of a basic modular unit 2 for storing and displaying a single, standard size, CD case 4 is illustrated in FIGS. 1 and 6. The exterior shell of the CD case 4 is about 5.6 inches wide between its side edges 6 and 8, about 5.0 inches high between its top edge 10 and bottom edge 12, and about ⅜ inches deep between its front face 14 and rear face 16. The top edge 10 defines a first pair of slots 18, 20, and the bottom edge defines a second pair of slots 22, 24 aligned with slots 18 and 20 respectively. The centers of each pair of slots on the same edge is spaced about 3.25 inches apart. Each slot is generally rectangular-shaped, about 5/16 inch long by about 0.05 inch wide and extending through the shell of the case 4. The shell of the case 4 is typically fabricated of clear, rigid plastic, enabling display through the front face 14 of an internal sheet 26 of paper material that can include a graphic design 28. The rear face includes a hinged door 29 for accessing an enclosed CD.

The modular basic unit 2 is adapted for securely storing the CD case 4 and displaying the graphic design 28. The unit 2 includes a frame 30 having a front surface 31 supporting four resiliently bendable cantilevers 32, 34, 36, 38 from their fixed ends. A first, top pair of spaced cantilevers 32, 34 located near the top edge 37 of the frame 30 are preferably angled down from the horizontal by an angle A. Angle A is about 15°–20°, and is preferably about 16°–17°. A second, bottom pair of spaced cantilevers 36, 38 are preferably angled up, also by angle A, from the horizontal and are generally aligned with and oppose the cantilevers 32, 34 respectively. Cantilevers 32, 34, 36 and 38 respectively include inwardly facing stop surfaces 39, 41, 43, and 45 from which extend tabs 40, 42, 44 and 46 that are adapted for removable insertion into slots 18, 20, 22 and 24 respectively. Tabs 40, 42, 44 and 46 are preferably rectangular-shaped to fit inside slots 18, 20, 22 and 24 easily but closely. The spacing between stop surfaces 39, 41, and stop surfaces 43, 45 is preferably slightly less than the spacing between the top and bottom edges 10, 12 of the CD case 4 when the cantilevers are in a relaxed position, preferably about 0.2 inch or less than the height of the case 4. This feature helps to ensure positive gripping of a case 4 between the resilient cantilevers 32, 34, 36, 38.

A second, door stop tab 64, 66, 68, 70 projects from the stop surface 39, 41, 43, 45 of preferably each of the cantilevers 32, 34, 36, 38, respectively, and is located between the respective tabs 40, 42, 44, 46 and the frame 30. The door stop tabs 64, 66, 68, 70 each include a door stop surface 72, 74, 76, 78, respectively, that resists accidental opening of the hinged door 29 when the CD case 4 is inserted or removed from the unit 2. Each of the door stop tabs 64, 66, 68, 70 are necessarily taller than tabs 40, 42, 44, 46 because of the angling of the cantilevers 32, 34, 36, 38, and is preferably about 0.2–0.25 inches in height. Door stop surfaces 72, 74, 76, 78 are spaced from tabs 40, 42, 44, 46, respectively, by a distance that allows insertion and removal of the CD case 4 without interference by door stop tabs 64, 66, 68, 70. Each door stop tab 64, 66, 68, 70 is also preferably longer than the length of each slot 18, 20, 22, 24 so that they cannot be inserted into the slots 18, 20, 22, 24. Although the embodiment of the invention illustrated in FIGS. 1 and 6 show a door stop tab for each cantilever 32, 34, 36, 38, the same functional result may be obtained with only a single door stop tab on one of the cantilevers, or with structure projecting from the front face 31 of the frame 30.

The frame 30 in this embodiment includes a pair of horizontal frame members 48, 50 rigidly connecting to a pair of vertical frame members 52, 54. The frame 30, which includes a preferably planar rear surface 79, can be mounted to a flat surface, such as a wall (not shown) with fasteners, such as bolts or screws 56 inserted through holes 58. The holes are preferably counter-sunk so that the heads of the fasteners are flush with or below the front surface 31 of the frame 30. The frame 30 and the cantilevers 32, 34, 36, 38 can be fabricated separately and then attached or preferably manufactured as a unit, for example, from a mold. If the unit 2 is injection molded, it is advantageous for the frame 30 to include injection holes 80, 82, 84, 86, extending between the front surface 31 and the rear surface 79, and located adjacent to cantilevers 32, 34, 36, 38, respectively, in order to more easily inject the moldable material into a mold.

The cantilevers 32, 34, 36, 38 each also preferably defines an opening 88, 90, 92, 94, respectively, located adjacent the frame 30 and being dimensioned to obtain a selected resiliency, or spring constant, for the cantilever. The resiliency of each cantilever 32, 34, 36, 38 will also depend upon the choice of material and the area of contact with the frame 30.

While the particular design of the frame 30 is a matter of choice and is not essential to the invention, it is preferable that the sides 60, 62 of the frame 30 should be spaced apart the same distance as the spacing of the side edges 6, 8 of the CD case 4 so that several basic units 2 can be mounted side by side and the CD cases that they each hold will be displayed without gaps between their side edges. The entire front face of each CD case will be exposed to view.

It will also be appreciated by those skilled in the art that either the horizontal frame members 48, 50 or the vertical frame members 52, 54 can be eliminated as long as the remaining frame members are secured to a surface such that tabs 40, 42, 44, and 46 are in the proper spaced apart relationship. For example, cantilevers 32 and 34 can be located on one elongated strip of material, and cantilevers 36 and 38 can be located on a second elongated strip, the two strips being mounted in parallel, spaced relation directly on a wall or on some other support surface. This type of arrangement would be more easily manufactured than the unitary frame 30 as described hereinbefore, but can be more difficult to install on a wall.

The entire modular unit can be fabricated from a resinous, moldable plastic appropriate for forming the resilient cantilevers, such as, for example, Lexan®. Alternatively, the frame and cantilevers can be fabricated from another resilient material, such as, for example, a spring metal. A variety of designs, which may include other combinations of material and methods of construction that produce the same functional result, will be apparent to those skilled in the art.

Installation of a CD case 4 into basic modular unit 2, as well as removal of the case 4 from basic unit 2, is easy. To insert the CD case 4, the slots 22, 24 located in the bottom edge 12 of the case 4 are aligned with the bottom tabs 44, 46 so that the tabs 44, 46 are engaged in the slots 22, 24 respectively. Downward directed force on the CD case 4 resiliently bends bottom cantilevers 36, 38 down, allowing the top edge 10 of the CD case 4 to be tilted towards the frame 30 and slipped underneath cantilevers 32, 34 so that tabs 40 and 42 are aligned with slots 18, and 20 respectively. The downward force is then released so that tabs 40 and 42 are engaged in slots 18 and 20 and the case 4 is securely gripped between stop surfaces 39, 41, 43, and 45. Preferably, there remains some slight resilient force exerted against the case 4 by each of the cantilevers 32, 34, 36, 38 so that the CD case 4 is securely held in place, regardless of the orientation of the unit. To remove the case 4, downward force is again applied to the case 4 so that tabs 40 and 42 are disengaged from slots 18 and 20. The top edge 10 of CD case 4 is then tilted away from the frame 30, and the case 4 is lifted up and away from the frame 30 to disengage slots 22 and 24 from bottom tabs 44 and 46, respectively, and thereby completing removal of the CD case 4 from the basic unit 2.

It should be understood that the terms top and bottom, when used in reference to the edges of the CD case 4 or parts of the basic unit 2 or other embodiments of the invention discussed hereinafter, are used for convenience and simplicity of exposition, and there is no preferred orientation for mounting the basic unit 2 on a wall or other surface. The modular unit 2 can be mounted at any angle on a vertical wall, or can even be mounted to a ceiling or a piece of furniture. The CD case 4 can also be turned 180° around a central axis normal to the front face 14 and installed "upside-down" because of the symmetry of the CD case. Regardless of the orientation of the CD case 4, the case is securely held in place by the tabs and cantilevers.

While it is preferred that each of cantilevers 32, 34, 36, 38 be resiliently movable, it is only necessary that just either the top pair 32, 34 or the bottom pair 36, 38 be resiliently movable in order to be able to insert or remove CD case 4. While the preferred embodiment described hereinbefore includes cantilevers that are rigidly fixed to the frame and resiliently bendable, one pair of the cantilevers can alternatively be attached to the frame by a thin, integrally formed hinge and springs in the hinge can be used to provide a return force for positively engaging a CD case.

Figure 2:
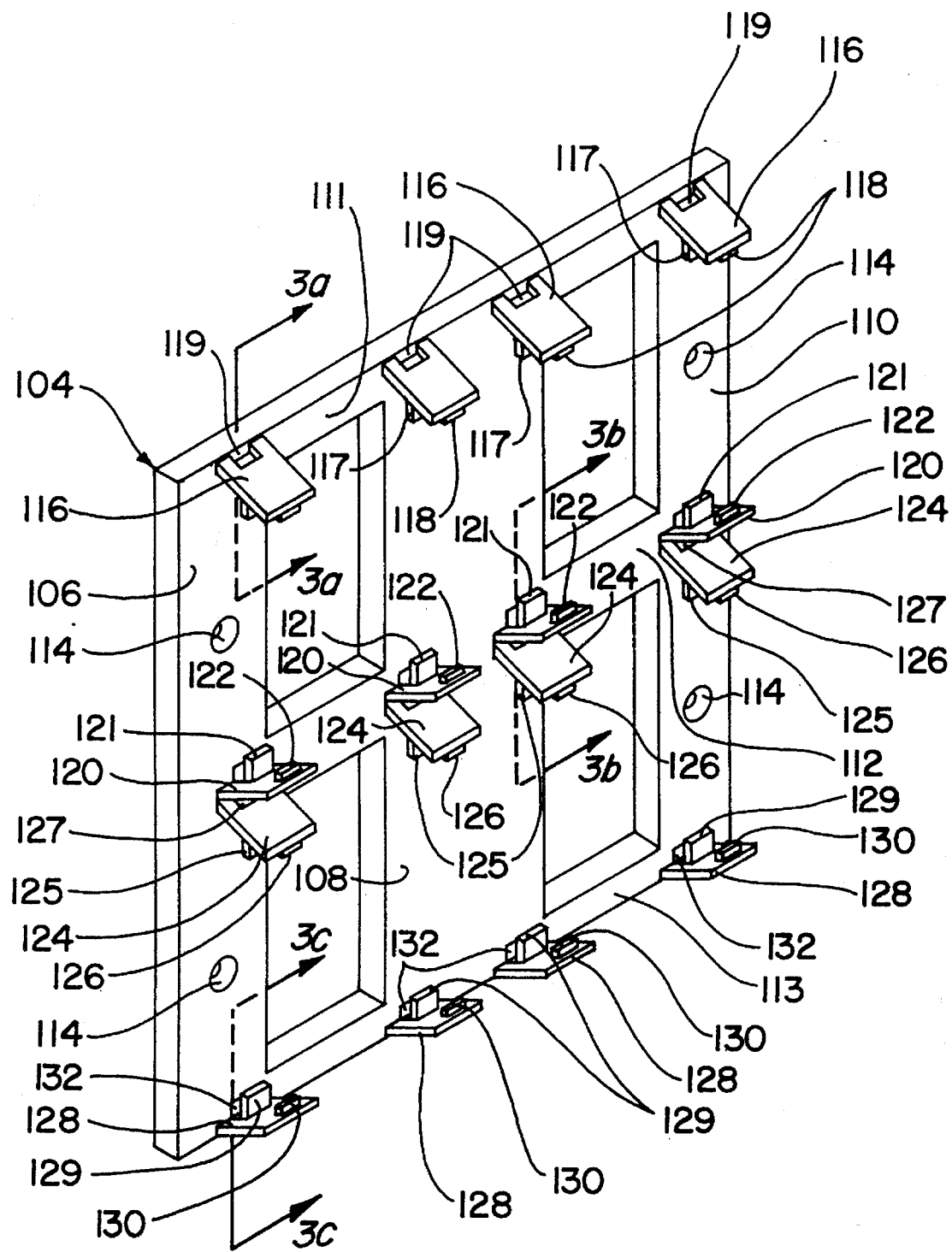
FIG. 2 is a perspective view of modular unit for storing four compact disk cases.
Figures 3A, 3B, 3C:
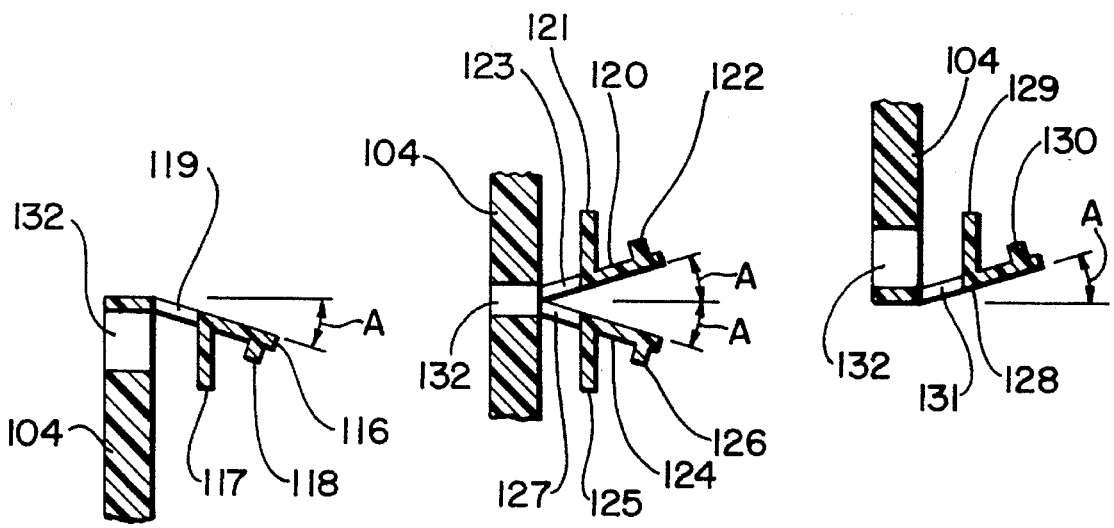
FIGS. 3a, 3b and 3c are cross sectional views through lines 3a—3a, 3b—3b and 3c—3c, respectively, of FIG. 2.
Figure 4:
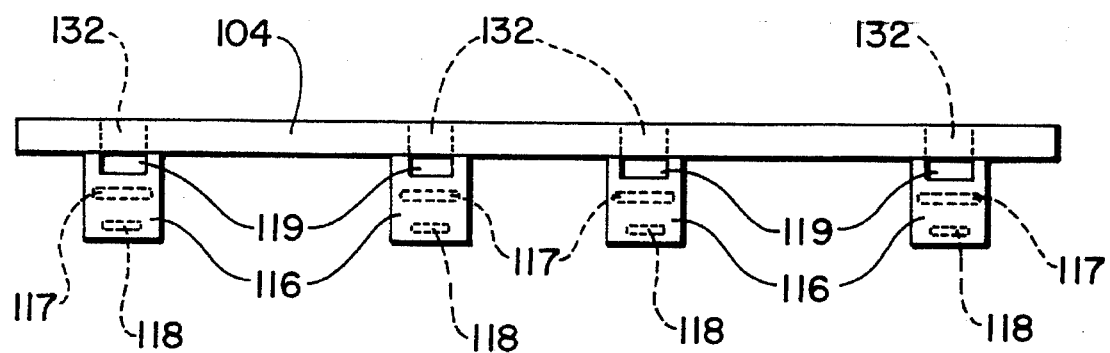
FIG. 4 is a top plan view of the modular unit of FIG. 2.

FIG. 2 illustrates a second type of modular unit that is adapted for storing and displaying up to four CD cases (not shown) in a rectangular, 2×2 array. The modular unit includes a frame 104 fabricated from a lattice of generally parallel, vertical frame members 106, 108, 110 connected by generally parallel, horizontal frame members 111, 112, 113. Two counter-sunk holes 114 for mounting fasteners (not shown) awe located in each of vertical frame members 106 and 110. Sixteen spaced cantilevers are arranged in four rows and four columns. Each of the four cantilevers 116 in the topmost row, one of which is shown in cross-section in FIG. 3a, are tilted downward from the horizontal and each includes a downward projecting tab 118 for insertion in a slot on one edge of a CD case. The four cantilevers 120 of the second row from the top, one of which is shown in cross section in FIG. 3b, are tilted upward from the horizontal, and each includes an upward projecting tab 122, opposing and generally aligned with a downward projecting tab 118 on one of the cantilevers 116, for insertion into a slot on an opposite edge of the same CD case. A third row of cantilevers 124, each tilted down from the horizontal and including a downward projecting tab 126 for insertion into a slot on one edge of a different CD case, is located immediately below the cantilevers 120. One of the cantilevers 124 is also shown in FIG. 3b. A fourth row of cantilevers 128, each tilted up from the horizontal, and each including an upward projecting tab 130 opposing one of tabs 126 for insertion into a slot on an opposing edge of the different CD case, is located near the bottom of frame 104. One of the cantilevers 128 is shown in cross section in FIG. 3c.

FIGS. 3a–3c and FIG. 4 show the construction of cantilevers 116, 120, 124 and 128 in greater detail. Each cantilever 116, 120, 124, and 128 includes, in addition to tabs 118, 122, 126, and 130, respectively, a door stop tab 117, 121, 125, and 129, respectively, and each defines an opening 119, 123, 127, and 131, respectively, for obtaining a selected resiliency. There is also an injection hole 132 extending through the frame 104 adjacent each cantilever 116, 120, 124, 128.

It will be noted that the structure of cantilever 116 illustrated in FIG. 3a is similar to the structure of cantilevers 32 and 34 of the embodiment of the invention illustrated in FIGS. 1 and 6, and that the structure of cantilever 128 is similar to the structure of cantilevers 36 and 38.

Figure 5:
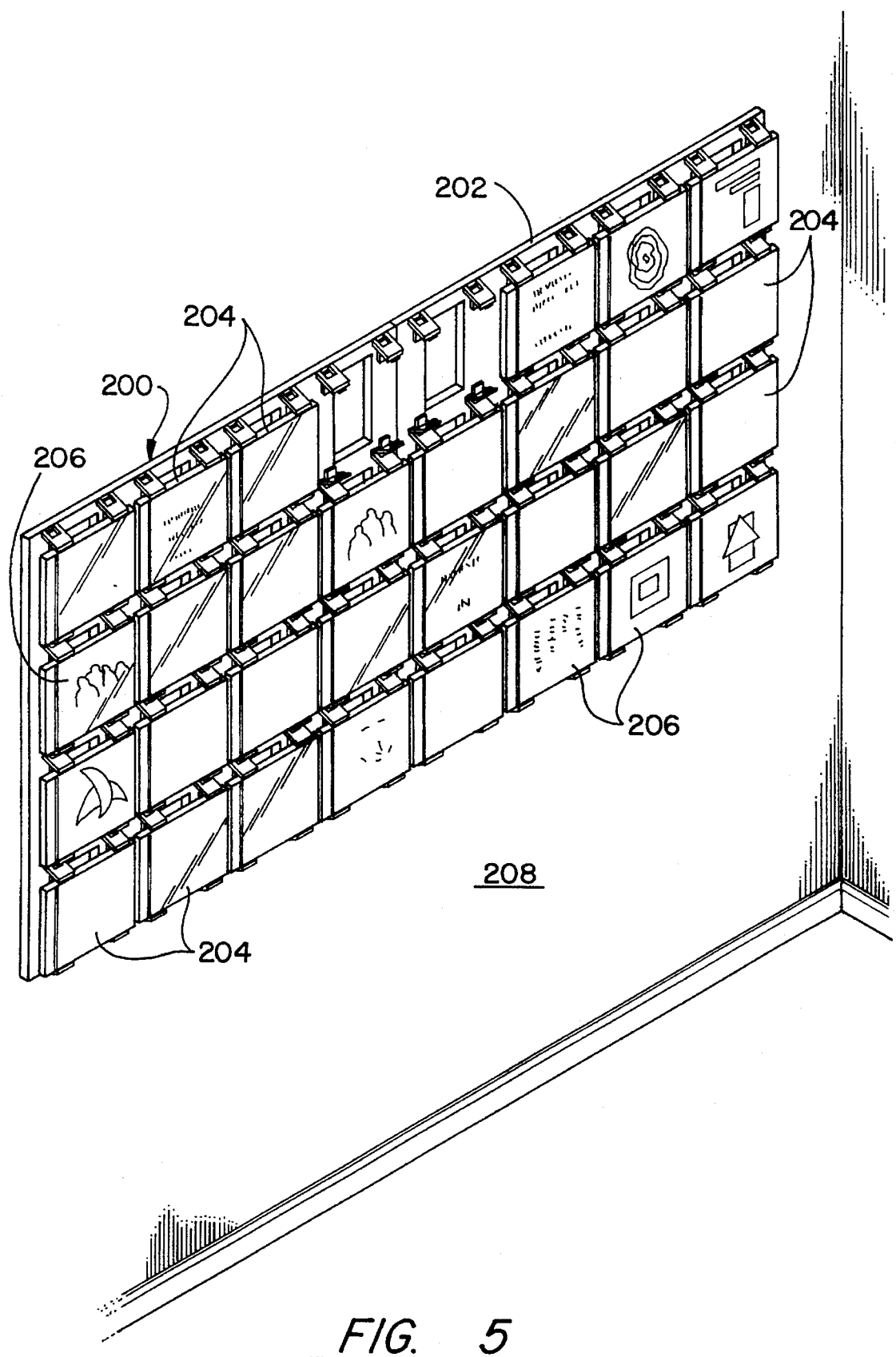
FIG. 5 is a perspective view of two modular units, each for storing sixteen compact disks, shown in use.

Referring now to FIG. 5, two identical modular units 200, 202 of a third type, each adapted for storing and displaying up to sixteen CD cases in a 4×4 rectangular-shaped array of rows and columns, are shown mounted on a wall 208. Each of the units 200, 202 is substantially filled with CD cases 204. The arrangement of the CD cases 204 in the units 200, 202 provides a pleasing visual collage that can be changed, if the graphic designs on the CD cases 204 are different, by simply rearranging the individual CD cases. The front face 206 of each CD case 204 is entirely open to view, unobstructed by any part of modular unit 200, 202. The front faces 206 are also generally coplanar.

It will be appreciated by those skilled in the art that a variety of different types of modular units can be fabricated according to the invention providing storage and display systems for CD cases or other types of rectangular-shaped cases having at least one slot on each of two spaced apart peripheral sides. A modular unit can be designed for storing and displaying up to N similarly sized rectangular-shaped cases, wherein N is an integer. The modular unit would include a frame supporting N pairs of spaced cantilevers projecting angularly outward from a front side of the frame, each of the N pairs of cantilevers including a first cantilever and a second cantilever, each of the first cantilever and second cantilever having a stop surface facing the stop surface of the other and a tab extending from the stop surface, wherein the first and second cantilever can cooperatively and resiliently grip one of the cases when the tabs are inserted into the first slot and the second slot. Instead of rectangular arrays as illustrated in FIGS. 2 and 5, modular units can be fabricated according to the invention that are adapted for storing and displaying a single row or a single column of CD cases, or for arranging adjacent CD cases among a curve.

It will additionally be appreciated that the frame supporting the cantilevers and tabs can be fabricated in a variety of shapes other than the rectilinear shapes described hereinbefore with reference to the preferred embodiments, so long as the cantilevers and tabs for holding each case is aligned in the proper spatial position and orientation. For example, a support frame can be fabricated in a shape suggestive of a musical instrument, a human or animal figure, or a variety of geometric designs. A support frame for a plurality of CD cases may also array the cases on the exterior of a rounded surface, such as a sphere or a column. Additionally, graphic designs or text can be included on the frame.

While the CD case described herein includes two slots in each of two parallel edges, some CD cases include three slots in each of two parallel edges. It will be appreciated that the preferred embodiments of the invention described hereinbefore and illustrated in the Drawings can be modified, according to the invention, to secure such cases by using one, two or three tabs to engage the slots on either of the edges. In fact, the storage and display system of the invention can be adapted for use with a variety of containers, other than CD cases, having one or more slots or holes in each of two parallel, spaced apart edges.

Whereas particular embodiments of the present invention have been described above as examples, it will be appreciated that variations of the details may be made without departing from the invention. Therefore, reference should be made to the appended claims rather than to the foregoing discussion of preferred examples, in order to assess the scope of the invention in which exclusive rights are claimed.

I claim:

1. A storage and display system for a case, the case being characterized by a front face, a rear face having a hinged door and spaced apart therefrom, peripheral first and second edges spaced apart from each other and extending from the front face to the rear face, and a first slot means defined by the first edge and a second slot means defined by the second edge, the system comprising:

a first tab for removable insertion into the first slot means;

a second tab, spaced from the first tab, for removable insertion into the second slot means; and support means for maintaining each of the first tab and the second tab in generally fixed spatial positions relative to each other, said first tab and said second tab having a surface area structured to be received in and mechanically interengaged with the first slot means and the second slot means respectively of the case when the case is positioned between said first tab and said second tab to cooperatively grip and support the case therebetween.

2. The system of claim 1, wherein said support means is substantially rectangular-shaped.

3. The system of claim 1, where the system is structured to secure the case such that the front face of the case between the first edge and the second edge is entirely unobstructed when the case is gripped by said first and second tabs.

4. The system of claim 3, wherein said support means includes: a support frame having a front side; and spaced apart first and second cantilever means extending outwardly from said front side of said support frame and supporting the first and second tabs respectively and providing a stop surface for the first and second edges of the case respectively when the case is gripped by said first and second tabs.

5. The system of claim 4, wherein at least one of said first and second cantilever means is resiliently movable.

6. The system of claim 5, wherein said first tab projects in a first direction generally toward said second cantilever means and said second tab projects in a second direction generally toward said first cantilever means.

7. The system of claim 6, wherein said first cantilever means is angled generally toward said second cantilever means and said second cantilever means is angled generally toward said first cantilever means.

8. The system of claim 4, wherein each of the first and second cantilever means is resiliently movable.

9. The system of claim 4, the case further characterized by third slot means defined by the first edge and fourth slot means defined by the second edge and, wherein said system comprises a third tab for removable insertion into the third slot means and a fourth tab for removable insertion into the fourth slot means, and wherein said support means includes spaced apart third and fourth cantilever means extending outwardly from said support means and supporting said third and fourth tabs respectively and providing a stop surface for the first and second edges of the case respectively when the case is gripped by the tabs.

10. The system of claim 4, wherein the resiliently movable cantilever means defines an opening adjacent said frame.

11. The system of claim 10, wherein the size of said opening is selected to obtain a selected resiliency of the resiliently movable cantilever means.

12. The system of claim 1, wherein said support means is modular and substantially rectangular-shaped, and structured to be positioned adjacent an identical, second support means for adjacently storing and displaying two rectangular-shaped cases.

13. The system of claim 1, wherein said case is a CD case and wherein said support means includes door stop means for inhibiting opening of the hinged door of said CD case during installation into or removal of the CD case from said system.

14. The system of claim 13, wherein said door stop means comprises a door stop tab providing a door stop surface projecting from the stop surface of one of said first and second cantilever means located between the tab on the one of said first and second cantilever means and said support frame.

15. A storage and display system for up to N similarly sized cases wherein N is an integer, each case being characterized by a first slot on a first edge and a second slot on a second edge opposite the first edge and a front face and a rear face with a hinged door therebetween, the system comprising a frame supporting N pairs of spaced cantilevers projecting outward from a front side of the frame, each of the N pairs of cantilevers including a first cantilever and a second cantilever, each of the first cantilever and second cantilever having a stop surface facing the stop surface of the other and a tab projecting from the stop surface, wherein the first and second cantilever can cooperatively grip one case when the tabs are inserted into the first slot and the second slot.

16. The system of claim 15, wherein said frame is generally rectangular-shaped.

17. The system of claim 15, wherein said system is structured to secure each of the up to N cases such that their front face is entirely unobstructed when being stored and displayed by the system.

18. The system of claim 17, wherein at least one of the first and second cantilevers of each of the N pairs is resiliently movable.

19. The system of claim 17, wherein each of the first and second cantilevers of each of the N pairs is resiliently movable.

20. The system of claim 17, wherein the system is structured such that the front faces of each case being gripped by the system is aligned coplanar with each of the other front faces.

21. The system of claim 17, wherein the frame is modular and rectangular-shaped, and is structured such that an edge of the frame can be positioned adjacent an edge of a frame of an identical, second system.

22. The system of claim 17, wherein said frame includes doorstop means for inhibiting opening of the hinged door of each case when being gripped by said system.

23. A system of claim 15, wherein said tab of said first cantilever and said second cantilever are substantially rectangular-shaped.

24. A system for storing and displaying at least one compact disk case which is characterized by a first pair of slots on a first edge, a second a pair of slots on a second edge opposite the first edge, a front face and a rear face with a hinged door therebetween, the system comprising a support frame and one basic unit supported by said support frame for each of the at least one compact disk case, each basic unit comprising:

a first pair of resiliently movable, spaced cantilevers projecting from a first side of the frame, each including a stop surface generally coplanar with the stop surface of the other and a tab projecting generally transversely from the stop surface, the tabs being adapted for removable insertion into the first pair of slots; and a second pair of spaced cantilevers projecting from the first side of the frame, each including a stop surface generally coplanar with the stop surface of the other and opposing the stop surfaces of the first pair of cantilevers, and each including a tab projecting generally transversely from the stop surface, the tabs being adapted for removable insertion into the second pair of slots when the tabs of the first pair of cantilevers are inserted into the first pair of slots such that each of the tabs and the stop surfaces cooperatively hold the case, the tabs of the first pair of cantilevers and the tabs of the second pair of cantilevers structured for mechanical interengagement with their respective first and second pair of slots when each of the tabs and stop surfaces cooperatively hold the case.

25. The system of claim 24, wherein the basic unit is structured such that the front fact of the case is substantially entirely unobstructed when the basic unit is holding the case.

26. The system of claim 25, wherein each of the second pair of cantilevers is resiliently movable.

27. The system of claim 26, wherein the first pair of cantilevers is angled towards the second pair of cantilevers and the second pair of cantilevers is angled towards the first pair of cantilevers.

28. The system of claim 27, wherein each basic unit comprises doorstop means for inhibiting opening of the hinged door of the case when said basic unit is holding the case.

29. The system of claim 24, wherein the system includes two basic units each structured to store and display a case whereby the front face of each case is generally coplanar with the front face of the other.

30. A storage and display system for a case, the case being characterized by a front face, a rear face having a hinged door and spaced apart from the front face, peripheral first and second edges spaced apart from each other and extending from the front face to the rear face, and first slot means defined by the first edge and second slot means defined by the second edge, the system comprising:

supportmeans, spaced apart first and second cantilever means mounted to and extending outwardly from said support means, first tab means supported by said first cantilever means and being removably insertable into the first slot means of the case, second tab means supported by said second cantilever means and being removably insertable into the second slot means of the case, at least one of said first and second cantilever means being resilient and movable relative to the other for easy insertion of said first and second tab means into the first and second slot means of the case for gripping and supporting the case between the first and second cantilever means and for the easy removal of said first and second tab means from the first and second slot means of the case for the releasing of the case from between the first and second cantilever means, said first and second tab means having a surface area structured to mechanically interengage the first and second slot means of the case upon said insertion of said first and second tab means into the first and second slot means of the case to resist movement of the case when being supported between said first and second cantilever means.

31. A system of claim 30, wherein said first and second tab means are rectangular-shaped.

32. A storage and display system for a case, the case being characterized by a front face, a rear face having a hinged door spaced apart therefrom, peripheral first and second edges spaced apart from each other and extending from the front face to the rear face, and a first slot defined by the first edge and a second slot defined by the second edge, the system comprising:

a first tab for removable insertion into the first slot;

a second tab, spaced from the first tab, for removable insertion into the second slot; and support means for maintaining each of the first tab and the second tab in generally fixed spatial positions relative to each other, wherein the first tab and the second tab cooperatively grip the case when inserted into the first and second slots;

said system being structured to secure the case such that the front face of the case between the first edge and the second edge is entirely unobstructed when the case is gripped by said tabs;

said support means including:

a support frame having a front side;

spaced apart first and second cantilevers extending outward from the front side of the support frame and supporting the first and second tabs respectively and providing a stop surface for the first and second edges of the case respectively when the case is gripped by the tabs;

at least one of the first and second cantilevers being a resiliently movable cantilever;

said support frame being modular and rectangular-shaped, and structured to be positioned adjacent an identical, second support frame for adjacently storing and displaying two rectangular-shaped cases.

33. The system of claim 32, wherein the resiliently movable cantilever defines an opening adjacent the frame, and wherein the size of the opening is selected to obtain a selected resiliency of the resiliently movable cantilever.

34. The system of claim 32, wherein said case is a CD case.

35. The system of claim 34 wherein the support means includes door stop means for inhibiting opening of the hinged door during installation into or removal of the CD case from the system.

36. The system of claim 35, wherein the door stop means comprises a door stop tab providing a door stop surface projecting from the stop surface of one of the first and second cantilevers, located between the tab on the one of the first and second cantilevers and the frame.

37. The system of claim 34, the case being further characterized by a third slot and fourth slot, and wherein the system comprises a third tab for removable insertion into said third slot and a fourth tab for removable insertion into said fourth slot, and wherein the support means includes spaced apart third and fourth cantilevers extending outward from the front side of the support frame and supporting the third and fourth tabs respectively and providing a stop surface for the first and second edges of the case respectively when the case is gripped by the tabs.

* * * * *